April 26, 1960 H. W. BOYLAN ET AL 2,933,942
UNITARY MECHANISMS FOR SEQUENTIAL CONTROL
Filed Sept. 16, 1955
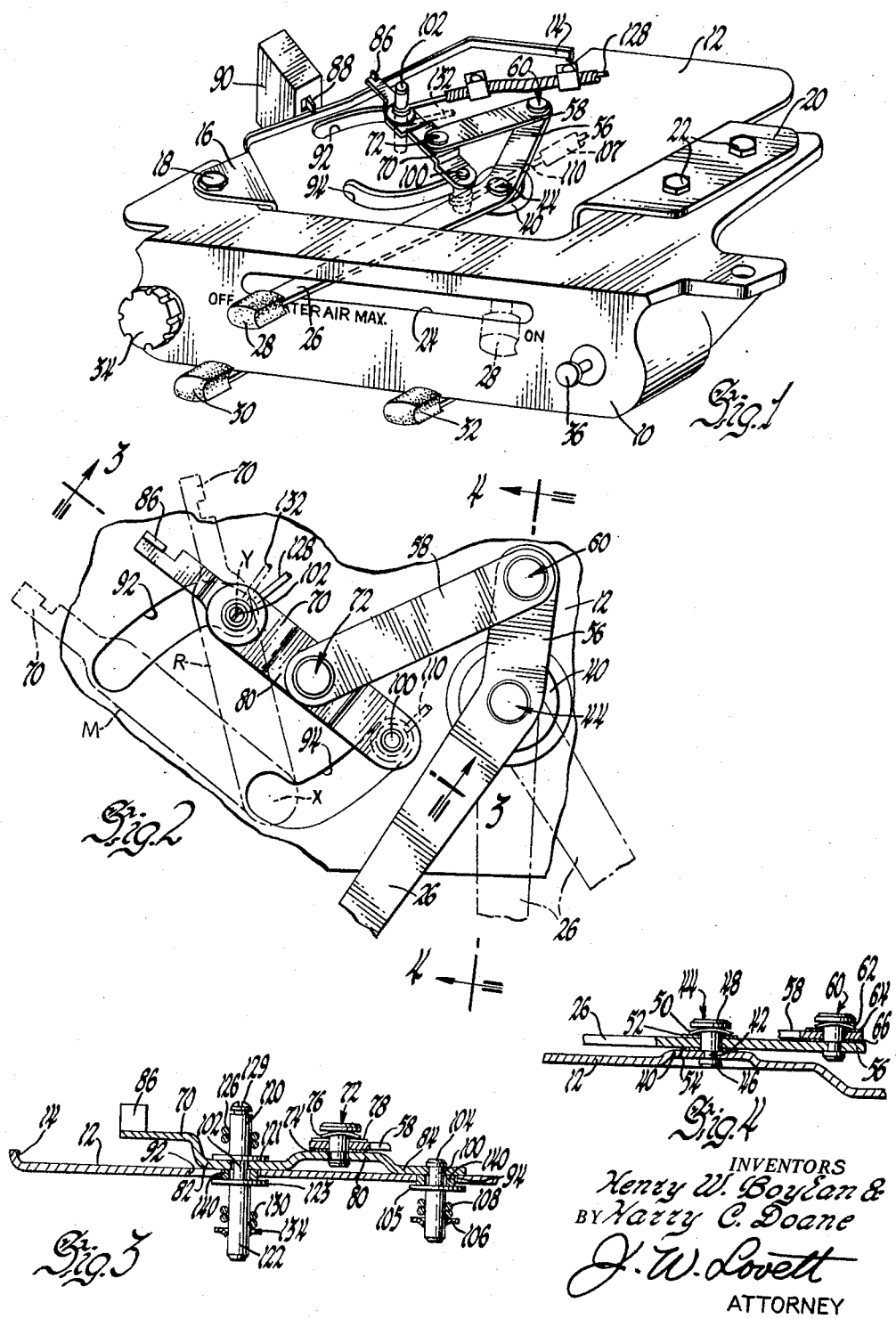
INVENTORS
Henry W. Boylan &
BY Harry C. Doane
J. W. Lovett
ATTORNEY

United States Patent Office 2,933,942
Patented Apr. 26, 1960

2,933,942
UNITARY MECHANISMS FOR SEQUENTIAL CONTROL

Henry W. Boylan and Harry C. Doane, Flint, Mich., assignors to General Motors Corporation, Detroit, Mich., a corporation of Delaware Application September 16, 1955, Serial No. 534,841

1 Claim. (Cl. 74—471)

This invention relates to control mechanisms and more particularly to unitary mechanisms for effecting preselected sequences of operation of at least two devices such as valves or switches employed in a system.

In controlling a particular automobile heating and ventilating system, for example, it has been found advantageous to open one valve without disturbing a second valve, subsequently to open the second and perhaps a third valve, and then to operate a switch. With a single control unit it has been desirable not only to effect such sequential movements in any of a number of systems in a preselected order, but also to effect movements of the valves and/or switches in the reverse order to return a given controlled system to its initial setting. Such a unitary control mechanism not only prevents confusion but assures proper functioning of the system when subjected to operation by unskilled hands. A mechanism for such a purpose should also remain in its adjusted or required position without being disturbed by any forces incidentally tending to move any of the valves, switches or instrumentalities which effect the control.

An object of the present invention is to provide an improved unitary mechanism for effecting preselected sequential movements in a system employing valves, switches and/or such instrumentalities whereby an operator, with one movement, may secure the desired sequence and, with a reverse movement, may bring the system to its initial setting.

A feature of the invention is a fixed support with arcuate cam slots therein and a movable member guided by those slots for pivotal motion to effect a sequence of operations.

These and other important features of the invention will now be described in detail in the specification and then pointed out more particularly in the appended claim.

In the drawings:

Fig. 1 is a perspective view of a supporting frame suitable for use on an automobile instrument panel and upon which a mechanism is installed embodying the present invention;

Fig. 2 is a plan view, drawn to an enlarged scale, of elements shown in Fig. 1;

Fig. 3 is a sectional view taken along the line 3—3 of Fig. 2; and

Fig. 4 is a sectional view taken along the line 4—4 of Fig. 2.

In the drawings a sub-panel 10 is depicted which may be attached to the underside of an automobile instrument panel in such a way as to be readily accessible to the operator. To this sub-panel is rigidly affixed a support 12 in the form of a rigid plate. A portion of the margin of the plate is flanged as at 14 to lend additional rigidity. One corner of the plate is formed into a triangular flange 16 by means of which the plate may be attached to the sub-panel 10 with the use of a screw 18. The opposite side of the plate is provided with a second, but rectangular, flange 20 and this flange is adapted to be attached to the sub-panel 10 by means of two screws 22. The exposed face of the sub-panel 10 is provided with a slot 24 to accommodate lateral movement of an operating member 26 having a knob 28 on the exposed end thereof. The sub-panel 10 is also provided with other controls but these are of no moment insofar as the present invention is concerned. It suffices herein to state that two movable knobs 30 and 32 are shown for operating thermostats, a rotatable knob 34 is provided to control a defroster valve, and a button 36 is provided to operate a snap switch for a blower.

An intermediate portion of the support plate 12 is so formed as to present a raised portion or boss 40. This portion is drilled to receive the reduced portion 42 of a pivot pin 44. Beneath the plate 12 the pin is upset as at 46 and interposed between a head 48 of the pin and the portion 40 is a spring washer 50, a steel washer 52, the operating member 26 and a brass washer 54.

The operating member or bell crank 26 has an arm 56 extending away from the fixed center or point represented by the pin 44 and the end portion of the arm is pivoted to a link 58 by means of a pivot pin 60. This pin is similar to the pin 44 and is provided with a spring washer 62, a steel washer 64 and a brass washer 66.

The other end of the link 58 is connected to an intermediate portion of a movable member 70 by means of a pivot pin 72. A brass washer 74 is interposed between the movable member 70 and the link 58 and a spring washer 76 and a steel washer 78 are utilized between the head of the pin 72 and the link 58. The intermediate portion of the movable member 70 is raised slightly as at 80 (Fig. 3) so that the upset end of the pin 72 will clear the upper face of the plate 12. Spaced portions 82 and 84 of the movable member 70 rest upon the upper face of the plate 12 and are in slidable relation therewith. One end of the movable member 70 is extended to present an upwardly directed tab 86. As will further appear, this tab is for operating a button or element 88 controlling a compressor switch 90. The latter is rigidly held in fixed relation with respect to the plate 12 by means not shown.

The plate 12 is provided with two arcuate slots 92 and 94. A substantial length of the slot 92 is formed around a point X or one end of the slot 94 with a constant radius. A substantial length of the slot 94 is similarly formed around a point Y or one end of the slot 92. With the two positions of the member 70 as illustrated in Fig. 2, it may be seen that the slots 92 and 94 are spaced at their ends a distance equal to the spacing of the pins or pivots 100 and 102.

Pins 100 and 102 extend through the slots 94 and 92, respectively, and these pins pass through the portions 84 and 82 of the movable member 70. The pin 100 is a tight fit in the portion 84 and its end is upset as at 104. The lower portion of the pin 100 is enlarged slightly and has affixed to it a disc 105 and a washer 106. The latter supports the looped end portion 108 of a Bowden wire 110 which is guided by a conduit 107.

The pin 102 is formed with two enlarged end portions 120 and 122 having discs 121 and 123, respectively. The portion 120 is adapted to rest upon the movable member 70 and looped ends 126 of a Bowden wire 128 are attached thereto. Looped ends 130 of the Bowden wire 132 are looped around the portion 122 above a washer 134 fixed to the portion.

Pins 100 and 102 may be made in various ways. Each may be formed of one piece or fabricated from several pieces. In Fig. 3 the pin 102 is shown as a fabricated element employing a screw 129.

As the description proceeds, it will be understood that the pins or pivots 100 and 102 should be free to move along and within the slots 94 and 92, respectively, and when urged in the proper direction. To this end, each pin is provided with a steel or nylon roller 140 for rolling engagement with the sides of its slot. These rollers are herein considered as parts of the pivots and are slightly thicker than the plate 12 and adequate clearance is left between the plate 12 and each of the discs 105 and 123 to permit motion of the pins.

In describing the operation of the control mechanism, it may be well again to refer to and present a curtailed description of an air conditioning and heating or ventilating system of an automobile as an example for the use of the present invention. With this in mind, it may be assumed that the Bowden wire 110 is connected to a valve controlling the air flow through a heater core (for heating) and an evaporator core (for cooling) placed in series and such a valve may be termed a "conditioned air valve." When such cores are installed in series in an air stream, only one or the other is made effective as a heat exchanger depending upon whether heating or cooling is desired. The Bowden wire 128 may be assumed to be connected to a valve provided for the control of the flow of recirculating air from the passenger compartment back to the system. This latter valve may be called a "recirculating air valve." The Bowden wire 132 may be assumed to be connected to an "outlet valve" for aiding in the distribution of heated air to the passenger compartment after that air has passed through the conditioned air valve. With such connections and the knob 28 being positioned at its extreme left within the slot 24 as viewed in Fig. 1, it will be seen that the compressor switch 90 should be open. In the example given this switch is utilized to control the compressor for the air conditioning system. Of course, the compressor should only be operated when cooling or dehumidification is required. With the knob 28 positioned to the left as stated, the conditioned air valve will be closed, the outlet valve will be open but ineffective, the switch 90 will be open so that the compressor is inoperative, and the recirculating valve will be closed—i.e.—no air is being discharged from the system.

When the knob 28 is moved to the right in a "first plane" and towards the abbreviated form of the word "Maximum" in Fig. 1, the pin 100 will swing about the point Y and the pin 102 will remain stationary because of the contours of the two slots 92 and 94. As a consequence, the switch 90 will remain in its off position, the recirculating valve will remain closed, but the air conditioning valve will begin to open and the outlet valve will begin effective heated air distribution. When pin 100 reaches point X, the conditioned air valve will be fully open, the bell crank 26 will be in its intermediate position, and member 70 will be at its position R.

Assuming that the knob 28 is moved further to the right and past the abbreviated form of the word "Maximum," the pin 100 being centered at X, the pin 102 will move counterclockwise about point X. The switch 90 will remain off but the recirculation valve, by means of wire 128, will begin opening and the air conditioning valve, by means of wire 110, will remain fully opened. The outlet valve, by means of wire 132, will begin to close to cut off the heated air flow controlled by it.

If the knob 28 is moved to its extreme right-hand position as shown in dotted lines in Fig. 1, the movable member 70 will assume its dot-and-dash position M as shown in Fig. 2. This will cause operation of the air conditioning compressor by actuating the switch 90 by way of the tab 86. The recirculation valve will be opened because of the Bowden wire 128. The air conditioning valve will remain fully open to pass cool air to outlets provided and the Bowden wire 132 will close the outlet valve (used for heated air only) leading to the passenger compartment.

A clear understanding of the operation or sequence of the valves and their arrangement in the air conditioning, heating or ventilating system employed above as an example is not essential for the understanding of the present invention and, therefore, those aspects pertaining to that system are not amplified herein. It suffices herein to state that in moving the knob 28 to the right, in a "first plane," the pin 100 moves before the pin 102 moves because of the swinging of the movable member 70 about the point Y and the arrangement of the slots being substantially parallel with that "first plane." When the pin 100 reaches the point X, it can go no further because of the shape of the slot 94 and, the overriding action being completed, the member 70 is thereafter caused to swing about a different point—the point X—bringing about the subsequent movement of the pin 102 and operation of the other valves or instrumentalities actuated by movement of that pin. Accordingly, it will be seen that the control mechanism is not limited in use to any particular system and may be employed elsewhere than in the automotive field.

A movement of the knob 28 from the right to the left results in a reversal in sequence with regard to the actuation of the instrumentalities involved.

We claim:

A unitary control mechanism including a fixed plate, a bell crank pivoted to said plate for rotary motion in a plane parallel thereto, a switch controlling element arranged in fixed relation with respect to said plate, arcuate cam slots formed in said plate with contours bulging from each other, one end of each of said slots being spaced substantially a given distance from each end of the other of said slots, the other ends of said slots being spaced a distance greater than said given distance, a movable member having pins fixed thereto, each of said pins extending into one of said slots and movable along the length of the latter, a link pivoted to said movable member between said pins and extending to and pivotally connected to said operating member at a point spaced from said fixed point, and the arrangement being such that rotation of said bell crank in one direction effects sequential movement of said pins and switch controlling element by movement of said movable member.

References Cited in the file of this patent

UNITED STATES PATENTS

| | | |
|---|---|---|
| 516,741 | Lange | Mar. 20, 1894 |
| 911,030 | Cookingham | Feb. 2, 1909 |
| 1,036,916 | Seaman | Aug. 27, 1912 |
| 2,008,727 | Sanford | July 23, 1935 |
| 2,460,693 | Hall | Feb. 1, 1949 |
| 2,571,028 | Gerry | Oct. 9, 1951 |
| 2,634,670 | Simons | Apr. 14, 1953 |

FOREIGN PATENTS

| | | |
|---|---|---|
| 716,697 | Germany | Jan. 27, 1942 |